United States Patent
Hack et al.

(10) Patent No.: US 11,498,023 B2
(45) Date of Patent: *Nov. 15, 2022

(54) METHOD AND SYSTEM FOR RECOVERING FLUID

(71) Applicant: Pall Corporation, Port Washington, NY (US)

(72) Inventors: Alexander J. Hack, Chichester (GB); Daniel G. Cunningham, Portsmouth (GB)

(73) Assignee: Pall Corporation, Port Washington, NY (US)

(*) Notice: Subject to any disclaimer, the term of this patent is extended or adjusted under 35 U.S.C. 154(b) by 527 days.

This patent is subject to a terminal disclaimer.

(21) Appl. No.: 16/728,298

(22) Filed: Dec. 27, 2019

(65) Prior Publication Data

US 2021/0197107 A1 Jul. 1, 2021

(51) Int. Cl.
| | |
|---|---|
| *B01D 46/62* | (2022.01) |
| *B01D 36/00* | (2006.01) |
| *B01D 35/16* | (2006.01) |
| *B01D 35/30* | (2006.01) |
| *B01D 29/27* | (2006.01) |
| *B01D 29/92* | (2006.01) |

(52) U.S. Cl.
CPC .......... *B01D 46/62* (2022.01); *B01D 2279/65* (2013.01)

(58) Field of Classification Search
CPC ........ B01D 35/26; B01D 35/01; B01D 35/04; B01D 35/147; B01D 35/30; B01D 29/00; B01D 29/27; B01D 29/92
USPC ........................ 55/385.1; 210/90, 188, 741
See application file for complete search history.

(56) References Cited

U.S. PATENT DOCUMENTS

| | | | | |
|---|---|---|---|---|
| 3,726,795 A | * | 4/1973 | Edwards ................ | B01D 35/02 141/330 |
| 5,798,041 A | * | 8/1998 | Zuk, Jr. .................. | B01D 63/08 210/435 |
| 5,863,436 A | * | 1/1999 | Matkovich .......... | A61M 1/0231 210/257.2 |
| 5,938,940 A | * | 8/1999 | Zuk, Jr. ................ | A61M 1/3627 210/488 |
| 6,030,539 A | * | 2/2000 | Zuk, Jr. ................ | A61M 1/3652 210/488 |
| 6,168,722 B1 | | 1/2001 | Olsen et al. | |
| 6,274,055 B1 | * | 8/2001 | Zuk, Jr. .............. | B01D 19/0031 210/488 |
| 6,902,671 B2 | | 6/2005 | Cappia et al. | |
| 9,427,512 B2 | | 8/2016 | DelGiacco et al. | |

(Continued)

FOREIGN PATENT DOCUMENTS

| | | |
|---|---|---|
| CN | 102337202 A | 2/2012 |
| CN | 103484358 A | 1/2014 |

(Continued)

OTHER PUBLICATIONS

Chinese National Intellectual Property Administration, Office action in counterpart Chinese Patent Application No. 202011557947.4, dated Feb. 24, 2022.

(Continued)

*Primary Examiner* — Minh Chau T Pham
(74) *Attorney, Agent, or Firm* — Leydig, Voit & Mayer, Ltd.

(57) ABSTRACT

Methods and systems for recovering retained filtered fluid are provided.

3 Claims, 1 Drawing Sheet

(56) References Cited

U.S. PATENT DOCUMENTS

| | | |
|---|---|---|
| 9,694,304 B2 | 7/2017 | Perreault et al. |
| 9,757,666 B2 | 9/2017 | Lin |
| 10,195,544 B2 | 2/2019 | Perreault et al. |
| 2009/0211985 A1* | 8/2009 | Gulati .................. A61M 60/554 210/90 |

FOREIGN PATENT DOCUMENTS

| | | |
|---|---|---|
| EP | 0 666 083 A2 | 8/1995 |
| EP | 0642801 B1 | 4/1998 |
| GB | 2473621 A | 3/2011 |
| JP | H5-500820 A | 2/1993 |
| JP | H6-500942 A | 2/1994 |
| JP | H7-017872 A | 1/1995 |
| JP | H11-076397 A | 3/1999 |
| JP | H11-513298 | 11/1999 |
| WO | WO 91/17809 A1 | 11/1991 |
| WO | WO 92/07656 A2 | 5/1992 |
| WO | WO 94/01193 A1 | 1/1994 |
| WO | WO 97/09106 A1 | 3/1997 |

OTHER PUBLICATIONS

European Patent Office, extended European Search Report in counterpart European Patent Application No. 20208006.5 dated Mar. 17, 2021.

Japan Patent Office, Office action in counterpart Japanese Patent Application No. 2020-191015, dated Nov. 30, 2021.

* cited by examiner

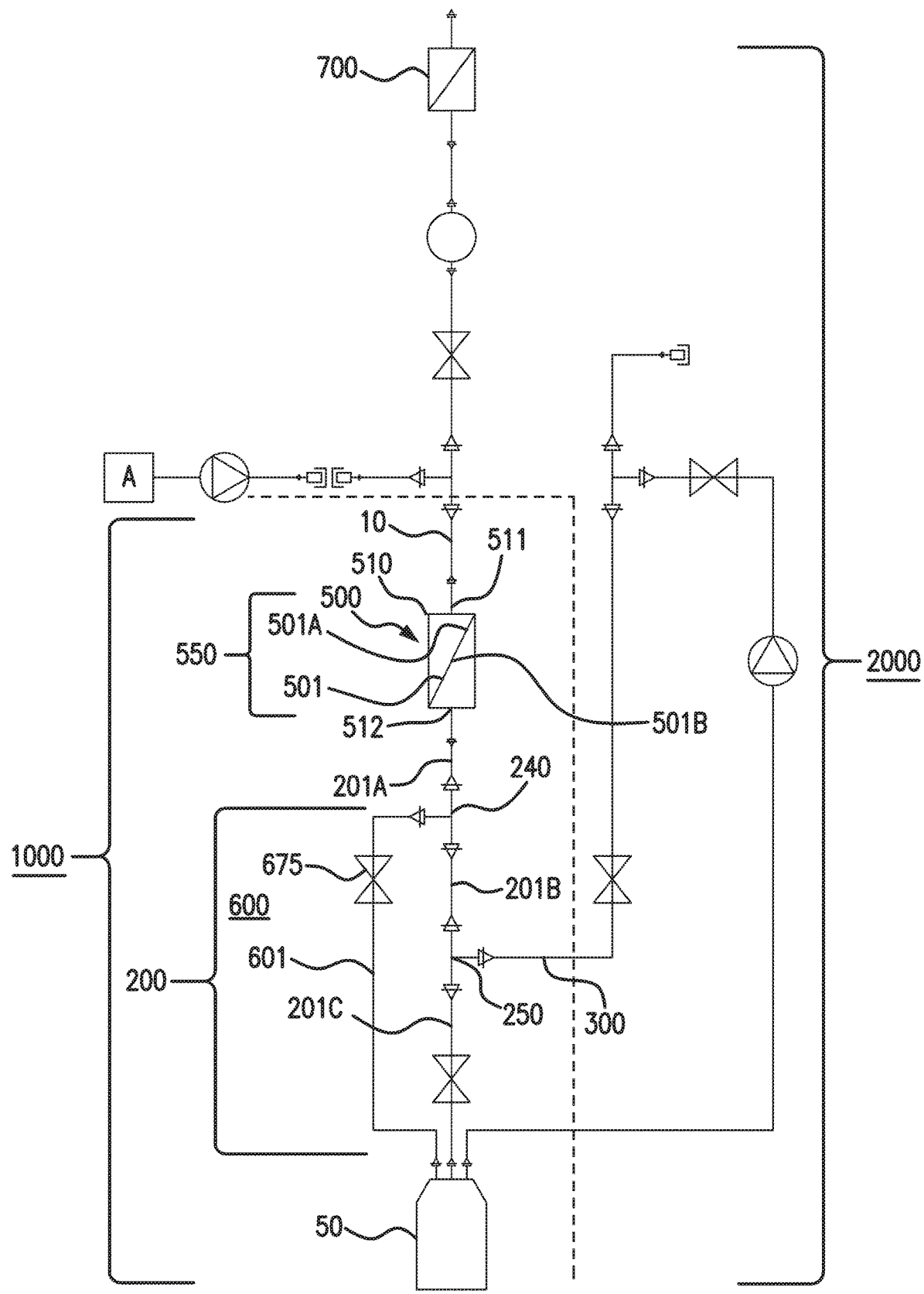

METHOD AND SYSTEM FOR RECOVERING FLUID

BACKGROUND OF THE INVENTION

After using a filter device to filter fluid in a closed system, a residual volume of filtered fluid can be retained between the downstream side of the filter medium and the filtered fluid receiving container for the filtered fluid. Some filtered fluids, e.g., those used in the pharmaceutical industry, are expensive, and thus, the loss of this fluid volume (for example, during the manufacture of biological therapeutics) can be costly. Further, during clinical trials, non-recoverable product may prevent manufacturers from preparing an adequate quantity of product, adversely impacting the ability to generate critical data that could lead to beneficial treatment. Cumulatively, the loss of even a few milliliters of fluid per filtration, can represent a significant amount of money.

There is a need for improved methods and systems for recovering retained filtered fluid.

The present invention provides for ameliorating at least some of the disadvantages of the prior art. These and other advantages of the present invention will be apparent from the description as set forth below.

BRIEF SUMMARY OF THE INVENTION

An embodiment of the invention provides a method for recovering filtered fluid retained in a filter system including a filter device comprising a housing having an inlet and an outlet defining a filtration flow path between the inlet and the outlet, and a porous filter medium across the filtration flow path, the porous medium having an upstream side and a downstream side; the system also including a filtered fluid receiving container arranged downstream of the outlet; a first fluid flow path between the outlet and the filtered fluid receiving container; a second fluid flow path between the first fluid flow path and the filtered fluid receiving container; wherein the second fluid flow path is connected to the first fluid flow path; the method comprising: (a) passing sterile air and/or sterile gas through the outlet of the filter device and along the first fluid flow path into the filtered fluid receiving container; (b) passing fluid to be filtered along the filtration flow path through the filter device and passing filtered fluid along the first fluid flow path into the filtered fluid receiving container, wherein a volume of filtered fluid is retained in the housing between the downstream side of the porous filter medium and the outlet; and, (c) allowing the sterile air and/or sterile gas to pass from the filtered fluid receiving container along the second fluid flow path into the first fluid flow path and through the outlet into the housing of the filter device, and displacing retained filtered fluid along the first fluid flow path into the filtered fluid receiving container.

Another embodiment of the invention provides a method for recovering filtered fluid retained in a filter system including a filter device comprising a housing having an inlet and an outlet defining a filtration flow path between the inlet and the outlet, and a porous filter medium across the filtration flow path, the porous medium having an upstream side and a downstream side; the system also including a filtered fluid receiving container arranged downstream of the outlet; a first fluid flow path between the outlet and the filtered fluid receiving container; a second fluid flow path between the first fluid flow path and the filtered fluid receiving container; wherein the second fluid flow path is connected to the first fluid flow path; the method comprising: (a) filtering fluid by passing the fluid along the filtration flow path through the filter device and along the first fluid flow path into the filtered fluid receiving container, including displacing, by the filtered fluid, sterile air and/or sterile gas into the filtered fluid receiving container, wherein a volume of filtered fluid is retained in the housing between the downstream side of the porous filter medium and the outlet; and, (b) allowing the sterile air and/or the sterile gas to pass from the filtered fluid receiving container along the second fluid flow path into the first fluid flow path and through the outlet into the housing of the filter device, and displacing retained filtered fluid into the filtered fluid receiving container.

In another embodiment, a system for recovering filtered fluid comprises (a) a filter device comprising a housing having an inlet and an outlet defining a filtration flow path between the inlet and the outlet, and a porous filter medium across the filtration flow path, the porous medium having an upstream side and a downstream side; (b) a filtered fluid receiving container arranged downstream of the outlet; (c) a first fluid flow path between the outlet and the filtered fluid receiving container; and (d) a second fluid flow path between the first fluid flow path and the filtered fluid receiving container; wherein the second fluid flow path is connected to the first fluid flow path.

BRIEF DESCRIPTION OF THE SEVERAL VIEWS OF THE DRAWING(S)

FIG. 1 is an illustrative schematic of two systems according to embodiments of the invention, wherein one system includes a sterilizing gas filter upstream of a second filter, and the other system includes the second filter, without the sterilizing gas filter.

DETAILED DESCRIPTION OF THE INVENTION

An embodiment of the invention provides a method for recovering filtered fluid retained in a filter system including a filter device comprising a housing having an inlet and an outlet defining a filtration flow path between the inlet and the outlet, and a porous filter medium across the filtration flow path, the porous medium having an upstream side and a downstream side; the system also including a filtered fluid receiving container arranged downstream of the outlet; a first fluid flow path between the outlet and the filtered fluid receiving container; a second fluid flow path between the first fluid flow path and the filtered fluid receiving container; wherein the second fluid flow path is connected to the first fluid flow path; the method comprising: (a) passing sterile air and/or sterile gas through the outlet of the filter device and along the first fluid flow path into the filtered fluid receiving container; (b) passing fluid to be filtered along the filtration flow path through the filter device and passing filtered fluid along the first fluid flow path into the filtered fluid receiving container, wherein a volume of filtered fluid is retained in the housing between the downstream side of the porous filter medium and the outlet; and, (c) allowing the sterile air and/or sterile gas to pass from the filtered fluid receiving container along the second fluid flow path into the first fluid flow path and through the outlet into the housing of the filter device, and displacing retained filtered fluid along the first fluid flow path into the filtered fluid receiving container.

Embodiments of the method can include passing air and/or gas through a sterilizing grade porous filter medium to produce the sterile air and/or the sterile gas, before passing the sterile air and/or the sterile gas along the filtration fluid flow path.

For example, in one embodiment of the method, the filter device comprises a sterilizing grade filter and passing air and/or gas through the sterilizing grade filter device along the filtration flow path provides the sterile air and/or sterile gas passing through the outlet of the filter device. Alternatively, or additionally, an embodiment of the method comprises passing air and/or gas through an additional filter device which is an upstream sterilizing grade filter device to provide sterile air and/or sterile gas, and subsequently passing the sterile air and/or sterile gas through the filter device used to filter fluid.

If desired, the method can also include, while filtering fluid by passing the fluid along the filtration flow path through the filter device and along the fluid flow path into the filtered fluid receiving container, displacing, by the filtered fluid, sterile air and/or sterile gas into the filtered fluid receiving container, wherein a volume of filtered fluid is retained in the housing between the downstream side of the porous filter medium and the outlet; and, allowing the sterile air and/or the sterile gas to pass from the filtered fluid receiving container along the fluid flow path and through the outlet into the housing of the filter device, and displacing retained filtered fluid into the filtered fluid receiving container.

Another embodiment of the invention provides a method for recovering filtered fluid retained in a filter system including a filter device comprising a housing having an inlet and an outlet defining a filtration flow path between the inlet and the outlet, and a porous filter medium across the filtration flow path, the porous medium having an upstream side and a downstream side; the system also including a filtered fluid receiving container arranged downstream of the outlet; a first fluid flow path between the outlet and the filtered fluid receiving container; a second fluid flow path between the first fluid flow path and the filtered fluid receiving container; wherein the second fluid flow path is connected to the first fluid flow path; the method comprising: (a) filtering fluid by passing the fluid along the filtration flow path through the filter device and along the first fluid flow path into the filtered fluid receiving container, including displacing, by the filtered fluid, sterile air and/or sterile gas into the filtered fluid receiving container, wherein a volume of filtered fluid is retained in the housing between the downstream side of the porous filter medium and the outlet; and, (b) allowing the sterile air and/or the sterile gas to pass from the filtered fluid receiving container along the second fluid flow path into the first fluid flow path and through the outlet into the housing of the filter device, and displacing retained filtered fluid into the filtered fluid receiving container.

In another embodiment, a system for recovering filtered fluid comprises (a) a filter device comprising a housing having an inlet and an outlet defining a filtration flow path between the inlet and the outlet, and a porous filter medium across the filtration flow path, the porous medium having an upstream side and a downstream side; (b) a filtered fluid receiving container arranged downstream of the outlet; (c) a first fluid flow path between the outlet and the filtered fluid receiving container; and (d) a second fluid flow path between the first fluid flow path and the filtered fluid receiving container; wherein the second fluid flow path is connected to the first fluid flow path.

Embodiments of the method can include introducing gas and/or air into the filter system before filter integrity testing or during filter integrity testing using forward flow or bubble point test methods, or as part of any system leak test procedures.

For example, in one embodiment of the method, the filter device comprises a sterilizing grade filter and passing air and/or gas through the sterilizing grade filter device provides the sterile air and/or sterile gas passing through the outlet of the filter device. Alternatively, or additionally, an embodiment of the method comprises passing air and/or gas through an additional filter device which is an upstream sterilizing grade filter device to provide sterile air and/or sterile gas, and subsequently passing the sterile air and/or sterile gas through the filter device used to filter fluid.

Typically, an embodiment of the method further comprises passing the filtered fluid from the filtered fluid receiving container for further processing, which may include, for example, other intermediate stages of any process that requires the continued use of a closed system, also including filling receptacles such as syringes, vials, ampoules, bottles, bioprocessing containers, bottles, and/or carbouys.

Advantageously, embodiments of the invention are compatible with processes involving integrity testing of filter devices and filter systems.

Embodiments of the invention are suitable for use in a variety of systems, including closed systems, particularly bioprocessing systems.

Embodiments of the invention are suitable for use with a variety of fluids to be filtered, for example, cell culture (e.g., including batch and fed-batch operations of suspension and adherent cell lines), preparing sterile or low bioburden fluids for the pharmaceutical and/or biopharmaceutical industries, including drugs, vaccines, and intravenous fluids, antibody- and/or protein-containing fluids, and/or fluids for the food and beverage industry.

A variety of filter devices, and containers, typically flexible (e.g., plastic) containers and conduits, including commercially available filter devices, containers, and conduits, are suitable for use in embodiments of the invention, and are known in the art. Suitable connectors, e.g., conduit connectors; moulded tubing; and flow control devices such as clamps, seals, valves, transfer leg closures, and the like, are known in the art.

In the following discussion, it should be recognized that sterile gas and sterile air can be used equivalently, e.g., embodiments referred to sterile gas also encompass the use of sterile air, and vice versa.

As used herein, the term "closed" refers to a system that allows the collection and processing (including filtration, and, if desired, the manipulation, e.g., separation of portions, separation into components, storage, and preservation) of fluid, without exposing the contents of the system to the environment in which it is being used. A closed system can be as originally made, or result from the connection of system components of sanitary fittings including sterile docking devices.

Each of the components of the invention will now be described in more detail below, wherein like components have like reference numbers.

FIG. 1 illustrates two embodiments of filter systems according to the invention. One embodiment of the system, 1000, is shown within dotted lines. Another embodiment of the system, 2000, includes the embodiment of the system 1000, and includes additional components, including upstream sterilizing grade filter device 700. The embodiments of the systems are discussed in more detail below.

The illustrated embodiment of the system 1000 includes a filter device 500 comprising a housing 510 having an inlet 511 and an outlet 512 defining a filtration flow path 550 between the inlet and the outlet, and a porous filtration medium 501 having an upstream side 501A and a downstream side 501B across the filtration flow path. The filter device typically has at least a bacterial removal rated porous filtration medium, and can have a sterilizing grade porous filtration medium. The filtration medium can have a variety of configurations, including planar, pleated and/or hollow cylindrical. Typically, the filter device is vented during the initial filtration of liquid so that the maximum available filter medium surface is used, and to prevent build-up of air or gas in the system. After the filter device housing is filled with liquid, the vent can be closed. Preferably, the filter device includes a vent, or vents can be arranged upstream and/or downstream of the filter device, so that air or gas can be vented from the system before filtration of the liquid is carried out.

One end of a conduit 10 is placed in fluid communication with the filter device inlet.

A filtered fluid receiving container 50 is arranged downstream of the outlet 512, and a first fluid flow path 200 shown comprising conduits 201A, 201B, 201C (shown connected by connectors 240 and 250 (alternatively, conduits can be moulded together); in some embodiments the first fluid flow path comprises a single conduit, or more than three conduits) is provided between the outlet 512 and the filtered fluid receiving container 50. Connector 250 is optional, and included if conduit 300 is present.

The illustrated embodiment of the filter system also includes an air and/or gas processing system 600 including a second fluid flow path 601 comprising at least one conduit, wherein the second fluid flow path is in fluid communication with the filtered fluid receiving container 50 at one end of the flow path and in fluid communication with the first fluid flow path 200 at the other end (shown in fluid connection via connector 240, alternatively, conduits can be moulded together). The illustrated second fluid flow path 601 includes an optional flow control device 675 (e.g., a valve or clamp) arranged between the ends of the flow path (e.g., the flow control device can be external to the conduit (e.g., a clamp that can compress the conduit) or within or between the conduit(s)).

Optionally, the system can include additional components, for example, FIG. 1 shows a flow control device 402.

Some embodiments of the method and system do not require the presence or use of flow control devices. However, in some other embodiments, flow control devices are associated with various conduits to allow or prevent flow through the conduits. Initially, the various flow control devices are closed to prevent flow through the conduits.

In one embodiment of the method, a container A containing the fluid to be filtered is connected to conduit 10. The system 1000 is arranged vertically, wherein the end of second flow path 601 where it connects with container 50 is at the highest point of the container. Preferably, the filtered fluid receiving container 50 is arranged such that the first fluid flow path is free-draining between the outlet of the filter and the receiving fluid container.

Fluid is filtered as it passes along the filtration flow path 550 through the porous medium 501. The filtered fluid (liquid) displaces sterile air ahead of it, and the displaced air, and filtered fluid, pass along the first fluid flow path 200 into the filtered fluid receiving container 50.

After filtration is completed, filtered fluid is retained in the filter device housing 510 between the downstream side 501B of the porous filtration medium and the housing outlet 512, and possibly in the fluid flow path 200.

After filtration, flow control device 675 is opened, and sterile air passes from the filtered fluid receiving container 50 (along with some air in 601 as far as flow control device 675) along the second fluid flow path 601 and through connector 240 into the upper part of the first flow path 200 via conduit 201A and through the outlet 512 of the filter device 500, and retained filtered fluid passes from the filter device housing and device outlet along the first fluid flow path into the filtered fluid receiving container 50.

As noted above, in accordance with any embodiment of the invention, the presence of flow control device 675 is optional, alternatively, if present, the flow control device 675 can be kept open while carrying out embodiments of the method. For example, once sufficient air or gas is present in receiving container 50 and in the second flow path relative to the downstream hold up volume in the filter device and conduits, then once filtration starts, the system will "self-recover" and sterile air or gas passes from the filtered fluid receiving container 50 along the second fluid flow path 601 and through connector 240 into the upper part of the first flow path 200 via conduit 201A and through the outlet 512 of the filter device 500, and retained filtered fluid passes from the filter device housing and device outlet along the first fluid flow path into the filtered fluid receiving container 50.

If desired, the filtered fluid receiving container can be aseptically disconnected from the system to maintain closure and moved to another location where the collected filtered fluid can be removed from the container.

Some embodiments of the method and system do not require the presence or use of an upstream sterilizing grade filter device. For example, as discussed above, the filter device 500 can comprise a sterilizing grade filter and passing air and/or gas through the sterilizing grade filter device along the filtration flow path provides the sterile air and/or sterile gas passing through the outlet of the filter device. Alternatively, or additionally, the end-user may be satisfied that the assembled system has been manufactured with a satisfactory low bioburden and/or have a clean enough air supply for the end-user's quality standards such that an upstream sterilizing grade filter device is not required. Alternatively, or additionally, the assembler of the system has filled the components of the system that need to receive air or gas with air or gas at the end of system assembly, but before the system is irradiated/subject to the preferred method of sterilization and shipped.

As noted above, the embodiment of the system 2000, includes the embodiment of the system 1000, and includes additional optional components, including an optional upstream sterilizing grade filter device 700, as well as pumps 801 and 802, connector 250, conduits 300 and 301, e.g., for connection to the next stage in processing, as well as flow control devices (such as clamps or valves) 401, and 403, and connectors 701 and 702.

In one embodiment, wherein the system includes conduit 301 and flow control device 403, flow control device 403 is initially closed (if flow control device 402 is present, it is initially open), after filtration, and after retained filtered fluid is passed into the filtered fluid receiving container, as described above, flow control device 403 is opened and pump 802 is operated such that fluid is passed along conduit 301 to the next stage of processing.

In another embodiment of the method, sterile air and/or sterile gas is introduced into the system 1000 before filtering the fluid. Illustratively, with respect to the embodiment of the system 2000, an optional sterilizing grade filtration device 700 is placed in fluid communication with conduit 10, flow control device 403 is closed, and gas or air is passed through the sterile filtration device (e.g., using a compressor, either directly from the compressor or via an instrument such as a filter integrity tester or a system leak tester) to provide sterile gas and/or sterile air which subsequently passes through the filtration device 500, along the filtration flow path 550 through the porous filtration medium 501 and along the fluid flow path 200 into the filtered fluid receiving container 50

A source container A containing the fluid to be filtered is placed in communication with conduit 10. Typically, the system includes a connector such that this container A, and the sterilizing grade filter device 700 can both be placed in communication with the conduit 10. Before liquid is filtered, flow control device 401 is closed.

Fluid is filtered as it passes along the filtration flow path 550 through the porous medium 501. Since sterile air is present in the system, the filtered fluid (liquid) displaces sterile air ahead of it, and the displaced air, and filtered fluid, pass along the first fluid flow path 200 into the filtered fluid receiving container 50.

After filtration is completed, filtered fluid is retained in the filter device housing 510 between the downstream side 501B of the porous filtration medium and the housing outlet 512, and possibly in the fluid flow path 200.

After filtration, flow control device 675 is opened, and sterile air passes from the filtered fluid receiving container 50 (along with some air in 601 as far as flow control device 675) along the second fluid flow path 601 and through connector 240 into the upper part of the first flow path 200 via conduit 201A and through the outlet 512 of the filter device 500, and retained filtered fluid passes from the filter device housing and device outlet along the first fluid flow path into the filtered fluid receiving container 50. If desired, flow control device 403 is opened, and pump 802 is operated such that fluid is passed along conduit 301 to the next stage of processing.

In another embodiment, gas or air can be introduced and passed into the filtered fluid receiving container 50 while flow control devices 401 and 402 are open, and flow control devices 404 and 675 (and 403, if present) are closed. After the gas or air is introduced flow control device 401 is closed and flow control device 404 is opened. A small amount of liquid (water or pharmaceutical fluid) can be passed through the filter device 500 to flush the filter device before use, and the fluid can be flushed through connector 250 and conduit 300. Subsequently, flow control device 402 is closed, and filtration proceeds, including passing filtered fluid along conduit 300 (rather than into container 50), and opening flow control device 675 to recover retained filtered fluid as discussed above, and the recovered fluid is passed along conduit 300 for further processing.

In yet another embodiment, gas or air can be introduced and passed into the filtered fluid receiving container 50 while flow control devices 401 and 402 are open and flow control devices 675, 403 and 404 are closed. Flow control device 404 is opened, and a small amount of liquid (water or pharmaceutical fluid) can be passed through the filter device 500 to flush the filter device at least once before use, and passed through connector 250 and conduit 300. Subsequently, flow control device 402 is opened and flow control device 404 is closed, and filtration proceeds with filtered fluid passing into receiving container 50. After filtration is completed, flow control device 675 is opened, allowing gas or air to pass along fluid flow path 200 and retained fluid to be recovered into container 50. If desired, flow control device 403 is opened, and pump 802 is operated such that fluid is passed along conduit 301 to the next stage of processing.

If desired, in accordance with any embodiment of the method, the filtered fluid can be passed from the filtered fluid receiving container elsewhere for further processing.

The following example further illustrates the invention but, of course, should not be construed as in any way limiting its scope.

EXAMPLE

This example demonstrates that filtered fluid remaining in the system after filtration can be recovered in accordance with an embodiment of the invention.

A system 2000 is set up as generally shown in FIG. 1.

The system includes a sterilizing grade filter devices 700 and 500 (500 is a KLEENPAK™ Capsule Filter (Pall Corporation, Port Washington, N.Y.)), flexible tubing, and a flexible bag (the filtered fluid receiving container 50).

Flow control device 401 is opened, and gas is passed through the sterilizing grade filter device 700 via a compressor, and the sterile gas is passed through filter device 500 into the filtered fluid receiving container 50. Flow control device 401 is closed.

A flexible bag containing 10 L of fluid to be filtered is attached to the system, and the system is arranged in a free draining orientation, and fluid is introduced initially using a pump and the filtration device is vented, and then filtration is performed using a peristaltic pump at a rate of up to 2 L/min.

Air is displaced by the fluid passing through the system, and the displaced air and filtered fluid passes into the filtered fluid receiving container.

After filtration is completed, flow control device 675 (a clamp on the conduit 601) is opened, allowing air to pass upwardly and through conduit 201A and the outlet 512 of the filter device. The air entering the filter device housing 510 displaces filtered fluid retained in the filter device (downstream of the filter medium 501) and filtered fluid retained in the tubing 201A, 201B downstream of the filter device, and the displaced filtered fluid is collected in the filtered fluid receiving container. An additional volume of about 50 mL of filtered fluid is recovered.

Subsequently, the filtered fluid is passed along conduit 301 for further processing.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for recovering filtered fluid retained in a filter system including a filter device comprising a housing having an inlet and an outlet defining a filtration flow path between the inlet and the outlet, and a porous filter medium across the filtration flow path, the porous medium having an upstream side and a downstream side; the system also including a filtered fluid receiving container arranged downstream of the outlet; a first fluid flow path between the outlet and the filtered fluid receiving container; a second fluid flow path between the first fluid flow path and the filtered fluid receiving container; wherein the second fluid flow path is connected to the first fluid flow path; the method comprising:

(a) passing sterile air and/or sterile gas through the outlet of the filter device and along the first fluid flow path into the filtered fluid receiving container;

(b) passing fluid to be filtered along the filtration flow path through the filter device and passing filtered fluid along the first fluid flow path into the filtered fluid receiving container, wherein a volume of filtered fluid is retained in the housing between the downstream side of the porous filter medium and the outlet;

and, (c) allowing the sterile air and/or the sterile gas to pass from the filtered fluid receiving container along the second fluid flow path into the first fluid flow path and through the outlet into the housing of the filter device, and displacing retained filtered fluid along the first fluid flow path into the filtered fluid receiving container.

2. A method for recovering filtered fluid retained in a filter system including a filter device comprising a housing having an inlet and an outlet defining a filtration flow path between the inlet and the outlet, and a porous filter medium across the filtration flow path, the porous medium having an upstream side and a downstream side; the system also including a filtered fluid receiving container arranged downstream of the outlet; a first fluid flow path between the outlet and the filtered fluid receiving container; a second fluid flow path between the first fluid flow path and the filtered fluid receiving container; wherein the second fluid flow path is connected to the first fluid flow path; the method comprising:

(a) filtering fluid by passing the fluid along the filtration flow path through the filter device and along the first fluid flow path into the filtered fluid receiving container, including displacing, by the filtered fluid, sterile air and/or sterile gas into the filtered fluid receiving container, wherein a volume of filtered fluid is retained in the housing between the downstream side of the porous filter medium and the outlet;

and, (b) allowing the sterile air and/or the sterile gas to pass from the filtered fluid receiving container along the second fluid flow path into the first fluid flow path and through the outlet into the housing of the filter device, and displacing retained filtered fluid into the filtered fluid receiving container.

3. The method of claim 1, including passing air and/or gas through a sterilizing grade porous filter medium upstream of the filter device in (a) to produce the sterile air and/or the sterile gas, before passing the sterile air and/or the sterile gas along the filtration flow path.

* * * * *